United States Patent [19]

Sasaki

[11] Patent Number: 4,607,376
[45] Date of Patent: Aug. 19, 1986

[54] DIGITAL RADIO RELAY SYSTEM
[75] Inventor: Susumu Sasaki, Fujisawa, Japan
[73] Assignee: Fujitsu Limited, Kawasaki, Japan
[21] Appl. No.: 671,776
[22] Filed: Nov. 15, 1984
[30] Foreign Application Priority Data Nov. 16, 1983 [JP] Japan ................... 58-215618

[51] Int. Cl.⁴ ............................... H04B 3/36
[52] U.S. Cl. .......................... 375/3; 370/75; 179/170 R
[58] Field of Search ........ 375/3, 4; 178/70 R, 178/71 T, 70 S, 71 B; 179/170 R, 170 A, 170 C, 170 F; 370/75, 97; 455/7, 9, 17, 601

[56] References Cited
U.S. PATENT DOCUMENTS 3,201,691 8/1965 Lyon ........................ 370/75
3,668,525 6/1972 McGraw .................... 455/7
4,107,608 8/1978 Saburi ....................... 375/3
4,197,496 4/1980 Hiyama .................. 179/170 A Primary Examiner—Robert L. Griffin
Assistant Examiner—Stephen Chin
Attorney, Agent, or Firm—Staas & Halsey

[57] ABSTRACT

A radio relay system for a fully-digitalized transmission network is disclosed. In the system, a received auxiliary signal can be by-passed from receiver to transmitter via a switching circuit provided in the auxiliary unit when an additional auxiliary signal is not input to the equipment. When a local auxiliary signal, for example, order wire signal from telephone equipment, is input, the switching circuit operatively disconnects the switching circuit and switches to supply the additional auxiliary signal to the transmitter. The auxiliary unit is thus by-passed upon the occurrence of a failure of the built-in circuit or power supply of the auxiliary unit.

16 Claims, 5 Drawing Figures

4,607,376

DIGITAL RADIO RELAY SYSTEM

BACKGROUND OF THE INVENTION

The present invention relates to a digital radio relay system, in particular, to a circuit unit for manipulating the auxiliary signals such as the so-called order wire signal and so forth, which are used for the the purpose of supervisory and/or maintenance operations of the system.

In a long haul digital radio transmission network, signals are relayed by a number of repeating stations installed between the terminal stations, wherein the auxiliary signal such as the so-called order wire signal, for example, is transmitted together with a digital main signal. Included in the auxiliary signals are the order wire signal for providing the stations with local telephone communications capability and others for monitoring and informing of the failure of the transmission circuit or a power supply of the relay equipment.

The auxiliary signal used in the digital radio transmission systems in the prior art has been an analog signal created by a moderate frequency modulation (FM) of the carrier radio frequency. The carrier wave is typically modulated by a main signal to be transmitted in the manner of a time-division multiplexed (TDM) digital signal by using PSK (phase shift keying), QAM (quadrature amplitude modulation), etc. prior to FM using the auxiliary signal.

However, the trend in modern systems for digital radio transmission is directed toward fully digitalized transmission, that is, both the main and auxiliary signals should be digital. This is because the concurrent operation of different modulation techniques such as FM and PSK or QAM, for example, in a digital radio transmission system makes the design and maintenance of the system complicated, and further, it is difficult to apply FM to the carrier which has been subject to PSK or QAM, particularly when the number of phases in PSK or the levels of QAM becomes large to increase the number of transmission channels on the carrier.

FIG. 1 is a conceptual block diagram for illustrating the operation of a digital radio transmission network comprising terminal stations 1 and 3 and the repeating stations 2, 2', etc. and FIG. 2 is block diagram showing an exemplary configuration of a relay equipment used for the repeating stations 2, 2', etc. in a prior-art fully-digitalized radio transmission network as shown in FIG. 1.

Each of the repeating stations, i.e., the relay equipment shown in FIG. 1, comprises a radio unit and an auxiliary unit 4, wherein the radio unit includes a receiver RX and a transmitter TX, while a hybrid circuit H is shown to represent the auxiliary unit 4 in FIG. 2. Such a network is usually bidirectional, however, FIG. 1 represents a situation where a signal is transmitted from the terminal station 1 to the terminal station 3. Therefore, in FIG. 1, in the terminal station 1 only a transmitter TX is illustrated, while only a receiver RX is illustrated in the terminal station 3.

In the following description, the order wire signal is taken to stand for the auxiliary signals, except when referring to other auxiliary signals.

Referring to FIGS. 1 and 2, a TDM transmission signal is sent from the terminal station 1 via the radio transmission line 100 to the repeating station 2, where it is separated into the main signal and the order wire signal by the receiver RX, and the main signal is directly sent to the transmitter TX. The order wire signal OW is input to the decoder 5 and converted to an analog audio frequency signal, and then, sent to telephone equipment (not shown). Another OW signal input from the telephone equipment in the repeating station 2 is sent to the encoder 6 via hybrid circuit H and converted to a digital signal, and then transmitted from the transmitter TX to the stations on the downstream transmission line together with the main signal in TDM mode. The output of the decoder 5 is branched to the hybrid circuit H, hence, the OW signal sent from a precedent station must be transmitted to all subsequent stations equally.

However, if a failure occurred in the auxiliary unit 4 shown in FIG. 2, the OW signal sent from a precedent station is received at the relevant station but it can not be transmitted to subsequent stations any longer. Accordingly, possible intercommunications by OW signals are limited between sections divided by the failed repeating station. It should be noted that the main signal separated by the receiver RX is, of course, sent to the transmitter TX, and transmitted to the subsequent stations, even when such failure occurs in the auxiliary unit.

In the prior art digital radio relay equipment, the auxiliary unit 4 is duplexed as is the radio unit in order to prevent the OW from interruption by failure of the auxiliary unit, however, this duplex configuration results in the reduction in the cost-performance characteristics and space factor of the equipment.

SUMMARY OF THE INVENTION

Therefore, it is the primary object of the present invention to provide cost-effective digital radio relay equipment.

It is another object of the present invention to provide digital radio relay equipment having an improved space factor.

It is still another object of the present invention to provide digital radio relay equipment having a function to permit an auxiliary signal to be sent from the precedent station to the subsequent station even in case of the failure of its built-in circuit or power supply.

It is yet another object of the present invention to provide a digital radio relay equipment whose auxiliary unit is relieved from the requirement of duplex configuration.

The above objects can be attained by providing the auxiliary unit in relay equipment with means to by-pass the digital auxiliary signal as sent from the precedent station to the subsequent station. The by-pass means comprises a switching circuit which operatively switches the output of the receiver RX to the input of the transmitter TX, when a failure of the circuit or power supply is detected in the auxiliary unit.

These and other objects, advantages and features of the present invention may be readily ascertained by referring to the following description and appended drawings in which like reference characters designate like or corresponding parts.

DESCRIPTION OF PREFERRED EMBODIMENT

Figure 2:
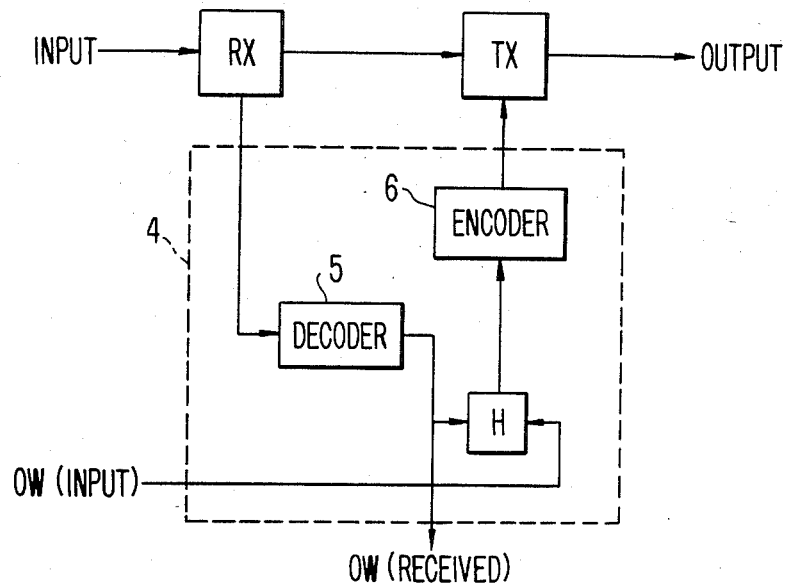
FIG. 2 is an exemplary circuit block diagram of prior-art fully-digitalized radio relay equipment.
Figure 3:
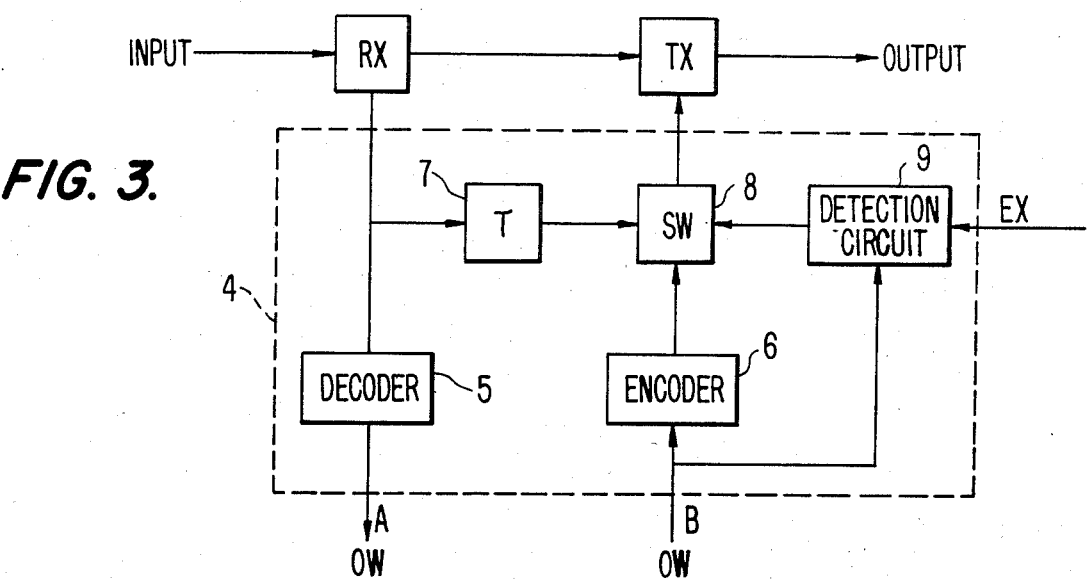
FIG. 3 is a circuit block diagram showing an essential configuration of the fully-digitalized radio relay equipment according to the present invention.

FIG. 3 is a circuit block diagram showing an essential configuration of the radio relay equipment according to the present invention. In FIG. 3, each operation of the receiver RX and the transmitter TX is the same as in FIG. 2. In FIG. 3, the digital auxiliary signal, separated from TDM digital signals by the receiver RX, is regenerated as the OW signal A, for example, by the decoder 5, and output to be used for telephone communications. The auxiliary signal output from the receiver RX is branched and by-passed to the switching circuit 8, after being subject to a delay operation by the delay circuit 7. As already mentioned, the main signal, separated from the TDM signals by the receiver RX, is directly sent to the transmitter TX.

The switching circuit 8 is operatively connected to the transmitter TX and switches the input line of the auxiliary signal to the TX to either of the encoder (6) side or the delay circuit (7), under the command of the detection circuit 9. The detection circuit 9 commands the switching circuit 8 to connect to the delay circuit 7 when the absence of the auxiliary signal is detected, for example, OW signal B. The absence of the OW signal B, for example, arises when: (a) none of the auxiliary signals are sent from the precedent stations and input to the subject auxiliary unit; (b) the subject auxiliary unit is inoperable because of the failure in the circuit or power supply of the auxiliary unit.

It is obvious that the OW signal A sent from the precedent stations is converted to an analog audio frequency signal and then recovered by the encoder 6 as the digital signal sent to the subsequent stations, as long as the operation of the auxiliary unit of the relay equipment at the station is normal. On the other hand, if a failure occurs in the auxiliary unit, the auxiliary signal, the OW signal B, is not input to the detection circuit 9, hence, the auxiliary signal sent from the precedent stations is by-passed to the switching circuit 8 via the delay circuit 7, and sent out from the transmitter TX together with the main signal to the subsequent stations under TDM mode.

The delay circuit 7 should be a passive device, because it must be operative even in a power failure. Such delay circuit is a delay line simply formed from a coaxial cable or a delaying cable of a specified length. The delay time given to the auxiliary signal by the delay circuit 7 is determined corresponding to the delay occurring on the main signal sent from the receiver RX to the transmitter TX.

It is also possible to command the switching circuit 8 to connect to the delay circuit 7 by inputting the external signal EX into the detection circuit 9, which is provided by manual operation when it is necessary to input no OW signal at the subject repeating station. This feature is significant for providing high reliability and quality operation of the relay equipment, because the OW signal sent from the precedent stations is subject to the quantization process when recovered as a digital signal by the encoder 6, this leads inevitably to the superposition of quantization noise which may be a cause of the reduction in signal quality. Therefore, it is preferable that the OW signal could be relayed without the quantization process unless necessary.

Figure 4:
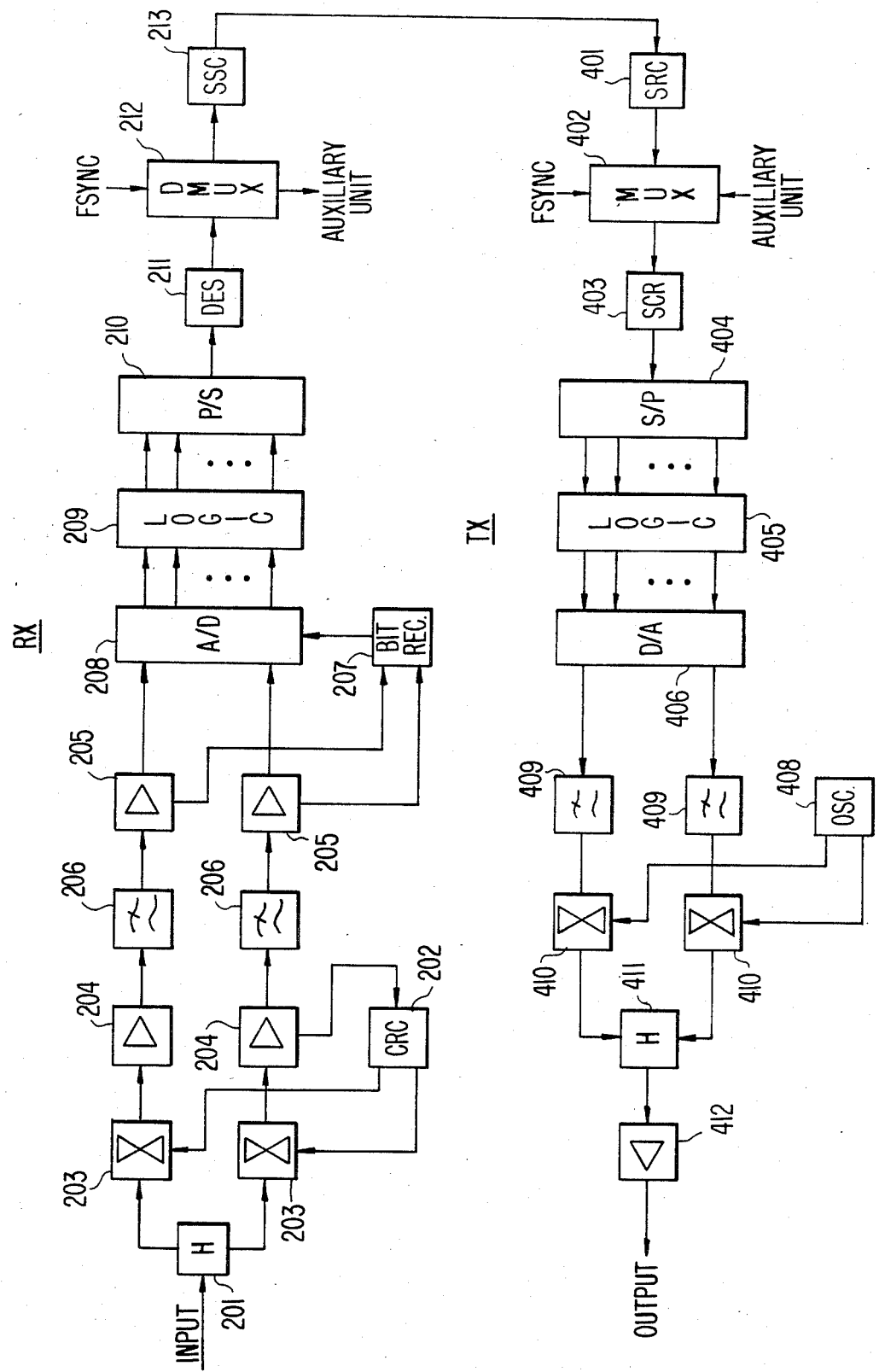
FIG. 4 is a circuit block diagram showing the detailed configuration of the radio unit of radio relay equipment used in a fully-digitalized radio transmission network operated under multi-level QAM mode.

FIG. 4 is a circuit block diagram showing configuration of the radio unit of relay equipment used in a fully-digitalized radio transmission network operated under 64-QAM mode, for example. The configuration in FIG. 4 is illustrated in details to some degree, however, since the radio unit is not the subject of the present invention, only the name of the circuit elements are given in the following, and their operation or performance will not given, for the sake of simplicity, except for the elements which are relevant to the invention.

In the 64-QAM mode, for example, the carrier wave is modulated to be one of 64 modulated waves in every time division. The modulated waves are different in their amplitudes and phases, and correlate to 64 different data represented by 6 bits. The modulation is carried out by mixing two sinusoidal waves different in phase by 90° (quadrature) and having respective 8 levels in amplitude. The original data can be reproduced by detecting the level of the two quadrature modulating wave components extracted from the transmitted carrier wave. Thus, permitting transmission of data represented by 6 bits at a time, the 64-QAM method can provide a transmission speed 6 times higher than a method wherein data is transmitted bit by bit.

Figure 5:
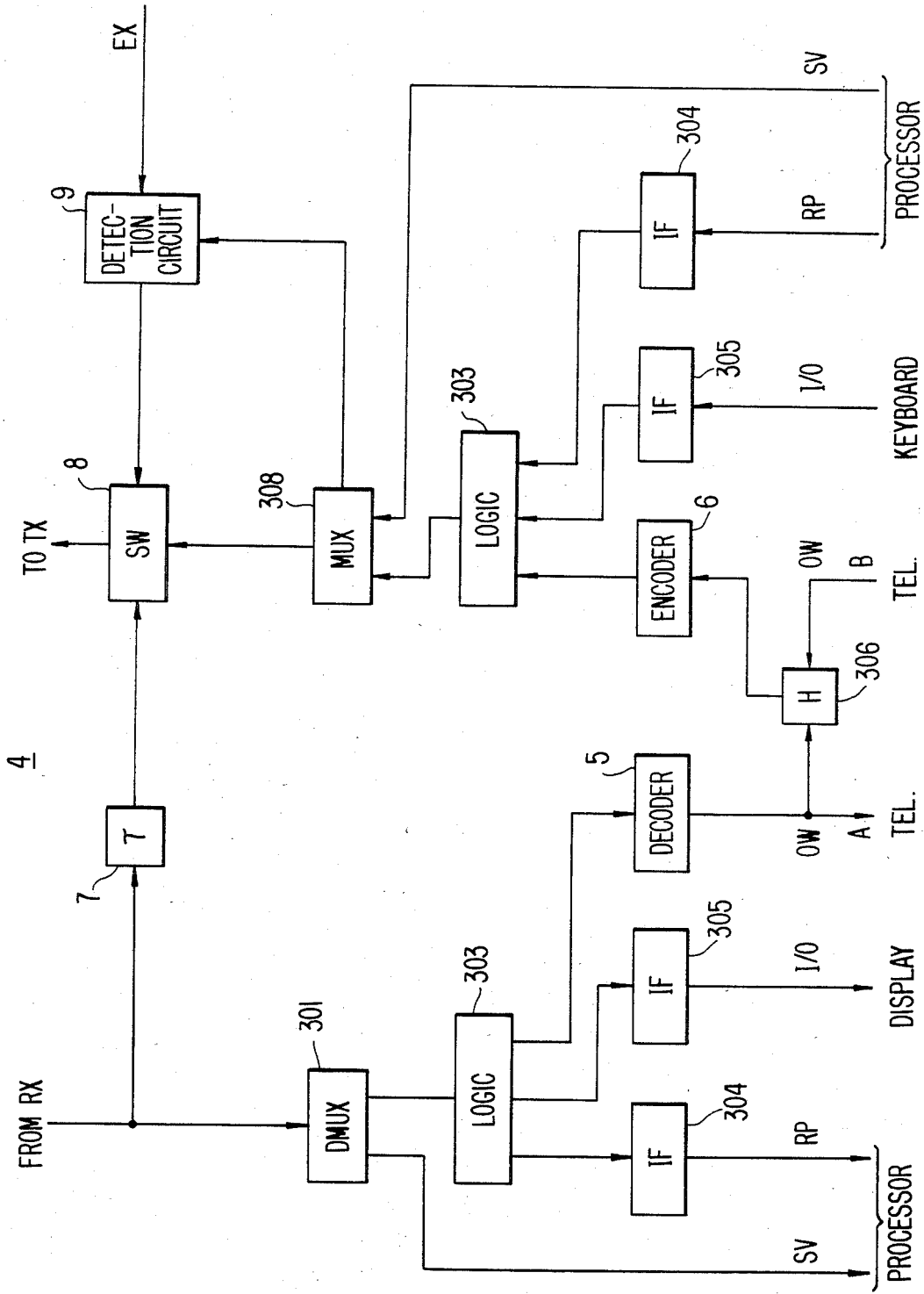
FIG. 5 is a circuit block diagram showing the detailed configuration of an auxiliary unit embodying the radio relay equipment according to the present invention.

Referring to FIG. 4, the main and auxiliary signals transmitted to the receiver RX according to a TDM 64-QAM method are regenerated as a parallel 6-bit signal, and then, converted into serial bit signals to be input to the demultiplexer DMUX 212. In accordance with the input of the frame synchronizing signal FSYNC, the DMUX 212 separates the main signal and the auxiliary signal to be respectively sent to the transmitter TX and the auxiliary unit 4 as shown in FIG. 5. Included in the receiver RX are hybrid circuit 201, carrier recovery circuit (CRC) 202, phase shifters 203, level amplifiers 204 and 205, low-pass-filters 206, bit timing recovery circuit (Bit Rec) 207, analog-to-digital converter (A/D) 208, logic circuit (LOGIC) 209, parallel-to-serial converter (P/S) 210, descrambler (DES) 211 and signal speed converter (SSC) 213, all of which are conventional ones and details of their functions and correlation can be obtained by the reference to a technical book such as "Data Transmission" by William R. Bennet, published by McGraw-Hill in 1965.

FIG. 5 is a circuit block diagram showing the detailed configuration of an auxiliary unit embodying the radio relay equipment according to the present invention. Referring to FIG. 5, the auxiliary signal sent from the DMUX 212 of the receiver RX in FIG. 4 is input to the demultiplexer DMUX 301. The auxiliary signal is branched to by-pass to the switching circuit 8, as explained with reference to FIG. 3. The auxiliary signal includes a supervisory signal SV for supervising the operational condition of the relay equipment, control signals such as route pilot signal RP, and others for local telephone communications (order wire OW signal) and for other communications via display terminal and keyboard (I/O). These auxiliary signals input to the DMUX 301 are separated to be sent to relevant devices such as processor, display terminal, telephone equipment, etc. The logic circuit (LOGIC) 303 is for controlling the timing and speed of the auxiliary signals. The interface circuits (IF) 303 and 305 relate to the route pilot signal RP and input/output control signal I/O, respectively.

The supervisory signal SV and route pilot signal RP both are processed by the processor which performs: (a) the diagnosis of the relay equipment to produce a result which is supplied to the terminal station 1 or 2 (see FIG. 1) via the supervisory signal SV; and (b) verifying the route pilot signal RP and judging whether the subject repeating station is responsible for the input main and auxiliary signals. The auxiliary signal I/O which is used for visual communications, for example, is output to the display terminal, and the OW signal A for the telephone communications is output to the telephone equipment.

The order wire OW signal A output from the decoder 5 is branched to the hybrid circuit (H) 306, and then, sent to the multiplexer (MUX) 308 via encoder 6 and the logic circuit 303 together with the order wire OW signal B input from the local telephone equipment. Other auxiliary signals including the supervisory signal SV and route pilot signal RP which are to be relayed to the subsequent stations are sent to the MUX 308 after being processed by the processor, together with the I/O signal input from the local keyboard.

The by-pass circuit comprising the delay circuit 7 and the switching circuit 8 is one newly introduced by the present invention as described with reference to FIG. 3. That is, the detection circuit 9 commands the switching circuit 8 connect to the MUX 308 to the transmitter TX if it detects the output of auxiliary signal from the MUX 308, while it commands the switching circuit 8 to connect the delay circuit 7 if it detects the absence of the auxiliary signal from the MUX 308. Thus, the output of the demultiplexer DMUX 212 of the receiver RX and the multiplexer 402 of the transmitter TX, both shown in FIG. 4 are interconnected by the delay circuit 7 and the switching circuit 8, and hence, the auxiliary signal sent from the receiver RX through the auxiliary unit 4 can be by-passed to the transmitter TX even when a failure occurs in the circuit or power supply of the auxiliary unit 4, as shown in FIG. 5. The detection circuit 9 also commands the switching circuit 8 to connect to the delay circuit 7 when receiving the external signal EX. The signal EX is for by-passing the auxiliary signal as sent from the precedent stations if it is necessary to input no auxiliary signal at the subject repeating station.

Figure 1:
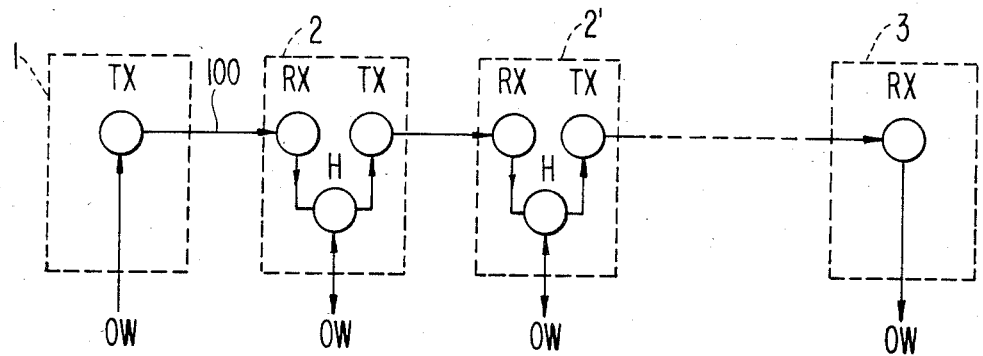
FIG. 1 is a conceptual block diagram for illustrating the operation of a digital radio transmission network.

Accordingly, the transmission of the auxiliary signal throughout the digital transmission network as shown in FIG. 1 can be assured without the duplexed configuration of the auxiliary unit as in the conventional digital radio relay equipment.

It is obvious that both of the switching circuit 8 and the detecting circuit 9 may be formed from a electromagnetic relay or semiconductor gate circuit. It is also obvious that the delay circuit 7 is not requisite, because the delay for adjusting the speed of signal between from the demultiplexer DMUX 212 to the multiplexer MUX 402 in FIG. 4 can be attained by controlling the frame synchronizing signal FSYNC.

The auxiliary signal output from the switching circuit 8 in FIG. 5 is multiplexed by the multiplexer MUX 402 of the transmitter TX in FIG. 4 together with the main signal. The main and auxiliary signals are converted into two base band signals in a manner just the opposite of the process in the receiver RX as explained above. Finally, a carrier wave generated by the oscillator (OSC) 408 is modulated under 64-QAM mode according to the base band signals, and then, transmitted to the subsequent stations from the transmitter TX. In the transmitter TX included are signal speed recovering circuit (SRC) 401, scrambler (SCR) 403, serial-to-parallel converter (S/P) 404, logic circuit (LOGIC) 405, digital-to-analog converter (D/A) 406, low-pass filters 409, and phase shifters 410, hybrid circuit (H) 411 and amplifier 412, all of which are also conventional ones and details of their functions and correlation can be obtained by the reference to the documents discussed above, for example.

I claim:

1. A digital radio repeating system operatively connected to receive a local auxiliary signal, comprising:
   a digital radio unit, comprising:
      receiving means for receiving time-division multiplexed digital main and first auxiliary signals sent from a precedent station and for separating the first auxiliary signal; and
      transmitting means for transmitting the digital main signal and one of the first auxiliary signal and a second auxiliary signal to a subsequent station, said transmitting means including multiplexing means for multiplexing the digital main signal and one of the first and second auxiliary signals under a time-division multiplex mode; and
   an auxiliary unit, operatively connected to said multiplexing and receiving means and to receive the local auxiliary signal, for generating the second auxiliary signal based on the local auxiliary signal and the first auxiliary signal which is sent from the precedent station and is separated in said digital radio unit, said auxiliary unit including detection means for detecting a failure of said auxiliary unit, said auxiliary unit ordinarily sending the second auxiliary signal to said multiplexing means for multiplexing with the digital main signal and said auxiliary unit sending the first auxiliary signal from the precedent station to said multiplexing means for multiplexing with the digital main signal for transmission to the subsequent station when said detection means detects the failure of said auxiliary unit.

2. The digital radio repeating system as recited in claim 1, wherein said auxiliary unit comprises by-pass means for by-passing the first auxiliary signal, as separated in said receiving means directly to said multiplexing means when the failure of said auxiliary unit is detected, whereby the digital main signal and the first auxiliary signal are transmitted to the subsequent station under the time-division multiplex mode.

3. A digital radio repeating system as recited in claim 1, wherein the first auxiliary signal is a digital signal produced by converting an analog signal.

4. A digital radio repeating system as recited in claim 1, wherein the first auxiliary signal is a digital signal representing digital data.

5. A digital radio repeating system as recited in claim 1, wherein said auxiliary unit includes a hybrid circuit operatively connected to said receiving means, said detection means, said multiplexing means and to receive the local auxiliary signal.

6. A digital radio repeating system as recited in claim 1, wherein the digital main and auxiliary signals are transmitted using Phase Shift Keying modulation.

7. A digital radio repeating system as recited in claim 1, wherein the digital main and first and second auxiliary signals are transmitted using Quadrature Amplitude Modulation.

8. A digital radio repeating system as recited in claim 1, wherein the auxiliary signal is an order wire signal transmitted between an originating station and a termination station.

9. A digital radio repeating system as recited in claim 1, wherein the auxiliary signal is a supervisory signal identifying a network station which added the supervisory signal.

10. A digital radio repeating system as recited in claim 1, wherein the auxiliary signal is a control signal.

11. A digital radio repeating system as recited in claim 5, wherein said auxiliary unit further comprises:
 a decoder operatively connected to said receiving means and said hybrid circuit; and
 an encoder operatively connected to said hybrid circuit, said detection means and said multiplexing means.

12. A digital radio repeating system as recited in claim 2, wherein said by-pass means comprises a switching circuit operatively connected to said receiving means, said multiplexing means and said detection means, said switching circuit ordinarily supplying the second auxiliary signal to said multiplexing unit and supplying the first auxiliary signal when said detection means detects the failure of said auxiliary unit.

13. A digital radio repeating system as recited in claim 12, wherein said by-passing means further comprises a delay circuit operatively connected to said receiving means and said switching circuit.

14. A digital radio repeating system as recited in claim 8, wherein said auxiliary unit further comprises:
 decoder means operatively connected to said receiving means; and
 encoder means operatively connected to said decoder means, said detection means, said multiplexing means and to receive the local auxiliary signal.

15. A digital radio repeating system as recited in claim 12, further comprising an external unit, operatively connected to said detection means, for generating a manual reset signal,
 wherein said detection means dispatches a control signal to said switching circuit when the manual reset signal is generated, and
 wherein said switching circuit supplies the first auxiliary signal to said transmitting means when the control signal is received.

16. A digital radio repeating system as recited in claim 12, wherein said auxiliary unit includes a power supply and said detection means detects an outage of the power supply as the failure of said auxiliary unit.

* * * * *